(12) United States Patent
Ostermann et al.

(10) Patent No.: US 10,346,878 B1
(45) Date of Patent: Jul. 9, 2019

(54) SYSTEM AND METHOD OF MARKETING USING A MULTI-MEDIA COMMUNICATION SYSTEM

(75) Inventors: Joern Ostermann, Morganville, NJ (US); Mehmet Reha Civanlar, Middletown, NJ (US); Barbara Buda, Morristown, NJ (US); Thomas M. Isaacson, Huntingtown, MD (US)

(73) Assignee: AT&T INTELLECTUAL PROPERTY II, L.P., Atlanta, GA (US)

( * ) Notice: Subject to any disclaimer, the term of this patent is extended or adjusted under 35 U.S.C. 154(b) by 3106 days.

(21) Appl. No.: 11/972,992

(22) Filed: Jan. 11, 2008

Related U.S. Application Data

(62) Division of application No. 09/999,525, filed on Nov. 2, 2001, now abandoned.

(60) Provisional application No. 60/245,521, filed on Nov. 3, 2000.

(51) Int. Cl.
 *G06Q 30/02* (2012.01)
(52) U.S. Cl.
 CPC .................. *G06Q 30/0269* (2013.01)
(58) Field of Classification Search
 CPC .................... G06Q 30/00–30/0284
 USPC ............................. 705/14.1–14.73
 See application file for complete search history.

(56) References Cited

U.S. PATENT DOCUMENTS

| | | | |
|---|---|---|---|
| 50,681 A | 10/1865 | Boyle | |
| 50,689 A | 10/1865 | Cooper | |
| 91,154 A | 6/1869 | Neal | |
| 109,680 A | 11/1870 | Slocomb | |
| 4,276,570 A | 6/1981 | Burson et al. | |
| 4,602,280 A | 7/1986 | Maloomian | |
| 5,113,493 A | 5/1992 | Grosby | |
| 5,347,306 A | 9/1994 | Nitta | |
| 5,387,178 A | 2/1995 | Moses | |
| 5,416,899 A | 5/1995 | Poggio et al. | |
| 5,420,801 A | 5/1995 | Dockter et al. | |
| 5,537,662 A | 7/1996 | Sato et al. | |
| 5,546,500 A | 8/1996 | Lyberg | |

(Continued)

FOREIGN PATENT DOCUMENTS

| | | |
|---|---|---|
| EP | 849 691 | 6/1998 |
| EP | 849 692 | 6/1998 |

(Continued)

OTHER PUBLICATIONS

Sami Lais, Is it Real, or Is It LifeFX?, Jan. 22, 2001, Computerworld, p. 61.*

(Continued)

*Primary Examiner* — John Van Bramer

(57) ABSTRACT

A system, method and computer-readable medium are disclosed for presenting an advertisement message associated with a multi-media message. The multi-media message is prepared by a sender using text and sender inserted emoticons in the text, and delivered audibly by an animated entity. The method uses a plurality of stored advertising messages from which to choose and advertising message to display. The method includes performing an emoticon analysis of the emoticons inserted by the sender, choosing an advertising message from the plurality of stored advertising messages according to the emoticon analysis and displaying the chosen advertising message.

3 Claims, 10 Drawing Sheets

(56) References Cited

U.S. PATENT DOCUMENTS

| | | | |
|---|---|---|---|
| 5,555,343 A | 9/1996 | Luther | |
| 5,555,426 A | 9/1996 | Johnson et al. | |
| 5,613,056 A | 3/1997 | Gasper et al. | |
| 5,630,017 A | 5/1997 | Gasper et al. | |
| 5,638,502 A | 6/1997 | Murata | |
| 5,640,590 A | 6/1997 | Luther | |
| 5,647,834 A | 7/1997 | Ron | |
| 5,657,426 A | 8/1997 | Waters et al. | |
| 5,659,692 A | 8/1997 | Poggio et al. | |
| 5,680,481 A | 10/1997 | Prasad et al. | |
| 5,689,618 A | 11/1997 | Gasper et al. | |
| 5,697,789 A | 12/1997 | Sameth et al. | |
| 5,732,232 A | 3/1998 | Brush et al. | |
| 5,745,360 A | 4/1998 | Leone et al. | |
| 5,781,186 A | 7/1998 | Jennings | |
| 5,818,461 A | 10/1998 | Rouet et al. | |
| 5,826,234 A | 10/1998 | Lyberg | |
| 5,832,115 A | 11/1998 | Rosenberg | |
| 5,848,396 A | 12/1998 | Gerace | |
| 5,850,463 A | 12/1998 | Horii | |
| 5,852,669 A | 12/1998 | Eleftheriadis et al. | |
| 5,852,775 A | 12/1998 | Hidary | |
| 5,857,099 A | 1/1999 | Mitchell et al. | |
| 5,860,064 A | 1/1999 | Henton | |
| 5,880,731 A | 3/1999 | Liles et al. | |
| 5,889,892 A | 3/1999 | Saito | |
| 5,933,151 A | 8/1999 | Jayant et al. | |
| 5,936,628 A | 8/1999 | Kitamura et al. | |
| 5,950,163 A | 9/1999 | Matsumoto | |
| 5,963,217 A | 10/1999 | Grayson | |
| 5,969,721 A | 10/1999 | Chen et al. | |
| 5,970,173 A | 10/1999 | Lee et al. | |
| 5,970,453 A | 10/1999 | Sharman | |
| 5,982,853 A | 11/1999 | Liebermann | |
| 5,983,190 A | 11/1999 | Trower et al. | |
| 5,995,119 A | 11/1999 | Cosatto et al. | |
| 5,995,639 A | 11/1999 | Kado et al. | |
| 6,002,997 A | 12/1999 | Tou | |
| 6,011,537 A | 1/2000 | Slotznick | |
| 6,014,634 A | 1/2000 | Scroggie et al. | |
| 6,014,689 A | 1/2000 | Budge et al. | |
| 6,018,744 A | 1/2000 | Mamiya et al. | |
| 6,018,774 A | 1/2000 | Mayle et al. | |
| 6,044,248 A | 3/2000 | Mochizuki et al. | |
| 6,064,383 A | 5/2000 | Skelly | |
| 6,068,183 A | 5/2000 | Freeman et al. | |
| 6,069,622 A | 5/2000 | Kurlander | |
| 6,075,857 A | 6/2000 | Doss et al. | |
| 6,075,905 A | 6/2000 | Herman et al. | |
| 6,078,700 A | 6/2000 | Sarachik | |
| 6,088,040 A | 7/2000 | Oda et al. | |
| 6,111,590 A | 8/2000 | Boezeman et al. | |
| 6,122,177 A | 9/2000 | Kitano | |
| 6,122,606 A | 9/2000 | Johnson | |
| 6,147,692 A | 11/2000 | Shaw et al. | |
| 6,161,082 A | 12/2000 | Goldberg et al. | |
| 6,166,744 A | 12/2000 | Jaszlics et al. | |
| 6,173,250 B1 | 1/2001 | Jong | |
| 6,195,631 B1 | 2/2001 | Alshawi et al. | |
| 6,208,359 B1 | 3/2001 | Yamamoto | |
| 6,215,505 B1 | 4/2001 | Minami et al. | |
| 6,219,638 B1 | 4/2001 | Padmanabhan et al. | |
| 6,225,978 B1 | 5/2001 | McNeil | |
| 6,230,111 B1 | 5/2001 | Mizokawa | |
| 6,232,966 B1 | 5/2001 | Kurlander | |
| 6,233,544 B1 | 5/2001 | Alshawi | |
| 6,243,681 B1 | 6/2001 | Guji et al. | |
| 6,289,085 B1 | 9/2001 | Miyashita et al. | |
| 6,307,567 B1 | 10/2001 | Cohen-Or | |
| 6,324,511 B1 | 11/2001 | Kiraly et al. | |
| 6,329,994 B1 | 12/2001 | Gever et al. | |
| 6,332,038 B1 | 12/2001 | Funayama et al. | |
| 6,343,141 B1 | 1/2002 | Okada et al. | |
| 6,366,286 B1 | 4/2002 | Hermanson | |
| 6,366,949 B1 | 4/2002 | Hubert | |
| 6,377,925 B1 | 4/2002 | Greene et al. | |
| 6,381,346 B1 | 4/2002 | Erasian | |
| 6,384,829 B1 | 5/2002 | Prevost et al. | |
| 6,385,581 B1 | 5/2002 | Stephenson | |
| 6,385,586 B1 | 5/2002 | Dietz | |
| 6,393,107 B1 | 5/2002 | Ball et al. | |
| 6,405,225 B1 | 6/2002 | Apfel et al. | |
| 6,417,853 B1 | 7/2002 | Squires et al. | |
| 6,433,784 B1 | 8/2002 | Merrick et al. | |
| 6,434,597 B1 | 8/2002 | Hachiya et al. | |
| 6,449,634 B1 | 9/2002 | Capiel | |
| 6,453,294 B1 | 9/2002 | Dutta et al. | |
| 6,460,075 B2 | 10/2002 | Krueger et al. | |
| 6,462,742 B1 | 10/2002 | Rose et al. | |
| 6,466,205 B2 | 10/2002 | Simpson et al. | |
| 6,466,213 B2 | 10/2002 | Bickmore et al. | |
| 6,476,815 B1 | 11/2002 | Ando | |
| 6,496,868 B2 | 12/2002 | Krueger et al. | |
| 6,522,333 B1 | 2/2003 | Hatlelid et al. | |
| 6,532,011 B1 | 3/2003 | Francini et al. | |
| 6,535,907 B1 | 3/2003 | Hachiya et al. | |
| 6,539,354 B1 | 3/2003 | Sutton et al. | |
| 6,542,936 B1 | 4/2003 | Mayle et al. | |
| 6,545,682 B1 | 4/2003 | Ventrella et al. | |
| 6,553,341 B1 | 4/2003 | Mullaly et al. | |
| 6,556,987 B1 | 4/2003 | Brown | |
| 6,606,096 B2 | 8/2003 | Wang | |
| 6,631,399 B1 | 10/2003 | Stanczak et al. | |
| 6,643,385 B1 | 11/2003 | Bravomalo | |
| 6,654,018 B1 | 11/2003 | Cosatto et al. | |
| 6,661,418 B1 | 12/2003 | McMillan et al. | |
| 6,665,860 B1 | 12/2003 | DeSantis et al. | |
| 6,680,934 B1 | 1/2004 | Cain | |
| 6,692,359 B1 | 2/2004 | Williams et al. | |
| 6,766,299 B1 | 7/2004 | Bellomo et al. | |
| 6,778,958 B1 | 8/2004 | Nishimura et al. | |
| 6,782,431 B1 | 8/2004 | Mukherjee et al. | |
| 6,784,901 B1 | 8/2004 | Harvey et al. | |
| 6,801,931 B1 | 10/2004 | Ramesh et al. | |
| 6,804,659 B1 | 10/2004 | Graham | |
| 6,833,845 B2 | 12/2004 | Kitagawa et al. | |
| 6,919,892 B1 | 7/2005 | Cheiky et al. | |
| 6,944,591 B1 | 9/2005 | Raghunandan | |
| 6,963,839 B1 | 11/2005 | Ostermann et al. | |
| 6,965,926 B1 | 11/2005 | Shapiro et al. | |
| 6,975,988 B1 | 12/2005 | Roth et al. | |
| 6,976,082 B1 | 12/2005 | Ostermann et al. | |
| 6,987,535 B1 | 1/2006 | Matsugu et al. | |
| 6,990,452 B1 | 1/2006 | Ostermann et al. | |
| 7,035,803 B1 | 4/2006 | Ostermann et al. | |
| 7,039,676 B1 | 5/2006 | Day et al. | |
| 7,091,976 B1 | 8/2006 | Ostermann et al. | |
| 7,158,986 B1 | 1/2007 | Oliver et al. | |
| 7,174,295 B1 | 2/2007 | Kivimaki | |
| 7,177,811 B1 | 2/2007 | Ostermann et al. | |
| 7,203,648 B1 | 4/2007 | Ostermann et al. | |
| 7,203,759 B1 | 4/2007 | Ostermann et al. | |
| 7,337,127 B1 | 2/2008 | Smith et al. | |
| 7,587,338 B2 | 9/2009 | Owa | |
| 2001/0019330 A1 | 9/2001 | Bickmore et al. | |
| 2001/0047384 A1 | 11/2001 | Croy | |
| 2001/0049596 A1* | 12/2001 | Lavine | G06F 17/2785 704/9 |
| 2001/0050681 A1 | 12/2001 | Keys et al. | |
| 2001/0050689 A1 | 12/2001 | Park | |
| 2001/0054074 A1 | 12/2001 | Hayashi | |
| 2002/0007276 A1 | 1/2002 | Rosenblatt et al. | |
| 2002/0010794 A1 | 1/2002 | Stanbach | |
| 2002/0016643 A1 | 2/2002 | Sakata | |
| 2002/0109680 A1 | 8/2002 | Orbanes et al. | |
| 2002/0120505 A1* | 8/2002 | Henkin | G06Q 30/02 705/14.69 |
| 2002/0176604 A1 | 11/2002 | Shekhar et al. | |
| 2002/0184028 A1 | 12/2002 | Sasaki | |
| 2002/0193996 A1 | 12/2002 | Squibbs et al. | |
| 2002/0194006 A1 | 12/2002 | Challapali | |
| 2003/0009452 A1* | 1/2003 | O'Rourke | G06F 16/4387 |
| 2003/0028378 A1 | 2/2003 | August et al. | |
| 2003/0035412 A1 | 2/2003 | Wang et al. | |

(56) References Cited

U.S. PATENT DOCUMENTS

| | | |
|---|---|---|
| 2003/0046160 A1 | 3/2003 | Paz-Pujalt et al. |
| 2003/0046348 A1 | 3/2003 | Pinto et al. |
| 2003/0060211 A1 | 3/2003 | Chern et al. |
| 2003/0158734 A1 | 8/2003 | Cruickshank |
| 2003/0191816 A1 | 10/2003 | Landress et al. |
| 2003/0208556 A1 | 11/2003 | Friedman et al. |
| 2004/0018858 A1 | 1/2004 | Nelson |
| 2004/0091154 A1 | 5/2004 | Cote |
| 2005/0091305 A1 | 4/2005 | Lange et al. |
| 2007/0033259 A1 | 2/2007 | Wies et al. |

FOREIGN PATENT DOCUMENTS

| | | |
|---|---|---|
| EP | 1111883 A2 | 6/2001 |
| JP | 2003-033575 | 2/2003 |
| KR | 2002-016482 | 3/2002 |
| WO | 199952238 | 10/1999 |
| WO | 0021057 | 4/2000 |
| WO | 2000070477 | 5/2000 |

OTHER PUBLICATIONS

Sami Lais, "Is It Real, or is it LifeFX", Jan. 22, 2001, Computerworld, p. 61 (Year: 2001).*

Ostermann, Beutnagel, Fischer, and Wang, "Integration of Talking Heads and Text-To-Speech Synthesizers for visual TTS", 5th International Conference on Spoken Language Processing (ICSLP 98), Sydney Austraila, Nov. 30-Dec. 4, 1998 (Year: 1998).*

Cosatto and Graf, "Sample-Based Synthesis of Photo-Realistic Talking Heads", Proceeding of Computer Animation, pp. 103-110, IEEE computer Society, 1998 (Year: 1998).*

E. Cosatto, et al "Photo-realistic Talking-heads from Image Samples", IEEE Transactions on Multimedia, Dept. 2000, vol. 2, issue 3, pp. 152-163.

Stephane Dupont, et al "Audio-Visual Speech Modeling for Continuous Speech Recognition" IEEE Trans. On Muitimedia. vol. 2, No. 3, Sep. 2000.

K-S. Lee, et al "TTS Based Very Low Bit Rate Speech Coder", Proc. ICASSP 1999, vol. 1, Mar. 1999, pp. 181-184.

R. Sproat, et al "Emu: An E-mail Preprocessor for Text-to-Speech", IEEE Signal Processing Society 1998 Workshop on Multimedia Signal Processing, Dec. 7-9, 1998, Los Angeles, CA, USA.

Mikio Kitai et el "Trends of ASR and TTS Applications in Japan", Proc. Of International Workshop on Interactive Voice Technology for Telecommunications Applications (IVTTA96), Sep. 1996.

D. Kurlander, et al "Comic Chat", Proceedings of the $23^{rd}$ Annual Conference on Computer Graphic and Interactive Techniques, Aug. 1996.

T. Naka et al., "A Compression/Decompression method for streaming based humanoid animation", Proceedings of Fourth Symposium on Virtual Reality Modeling Language, Feb. 23-26, 1999, VRML '99, ACM Press, NY, NY, pp. 63-70.

K. Perlin et al., "Improv: a system for scripting interactive actors in virtual worlds", Proceedings of the $23^{rd}$ Annual Conference on Computer Graphics and Interactive Techniques, SIGGRAPH '96, ACM Press, NY, NY, pp. 205-216.

Pollack "Happy in the East or Smiling in the West", New York Times, Aug. 12, 1996.

Pelachaud, et al "Generating Facial Expressions for Speech", Cognitive Science, Jan. 3, 1996, vol. 20, No. 1, pp. 1-46.

W. Keith Edwards, "The Design and Implementation of the MONTAGE Multimeda Mail System", Apr. 1991, IEEE Conference Proceedings of TRICOMM '91, pp. 47-57.

Ming Ouhyoung, et al "Web-enabled Speech Driven Facial Animation", Proc. Of ICAT'99 (Int'l Conference on Artifical Reality and Tele-existance), pp. 23-28, Dec. 1999, Tokyo, Japan.

H. Noot, et al Chartoon 20.0 Manual, Jan. 31, 2000.

Lijun Yin, et al "MPEG4 face modeling using fiducial points", IEEE; Image Processing, 1997, Proceedings., International Conference on, vol. 1, 26-29, 1997.

F. Pighin et al., "Synthesizing realistic facial expressions from photograhs", Proceedings of the $25^{th}$ Annual Conference on Computer Graphics and Interactive Techniques, SIGGRAPH '98, ACM Press, NY, NY, pp. 75-84.

Marks et al., "Fuzzy and extra crisp alternating projection onto convex sets (POCS)", Proceedings IEEE International Conference on Fuzzy Systems, vol. 2, Mar. 20-24, 1995, pp. 427-435.

Bickmore, et al "Animated Autonomous Personal Representatives", ACM, International Conference on Autonomous Agents, Proceedings of the Second International Conference on Autonomous Agents, pp. 8-15, 1998.

Thorisson, Kristinn R. "ToonFace: A System for Creating and Animating Interactive Cartoon Faces," MIT Media Laboratory Learning and Common Sense Section Technical Report, pp. 96-101, Apr. 1996.

Zs. Ruttkay, P. ten Hagen, H. Noot. and M. Savenije, Facial animation by synthesis of captured and artificial data, CAPtech '98 proceedings, 1998.

J. Hendrix, et al., "A facial repertoire for avatars", Proceedings of the Workshop "Interacting Agents", Enschede, The Netherlands, 2000, pp. 1-20.

Decarlo et al., "An anthropometric face model using variational techniques," In Proc. Of $25^{th}$ Annl Conf. on Computer Graphics & Interactive Tech. Siggraph 98, ACM Press, NY, 67-74.

Jian-Gang Wang et al. "Morphology-based front-view facial contour detection" IEEE Int'l Conf on Systems, Man and Cybernetics, vol. 4, Oct. 2000, pp. 2775-2780.

Shinn-Yin Ho et al., "Facial modelling fr. An uncalibrated face image using flexible generic parameterized facial models," IEEE Trans. on Systems, Man, & Cybernetics, Pt B, V. 31.

Noh, J. et al, "Expression cloning", In Proc. Of $28^{th}$ Annual Conf. on Computer Graphics and Interactive Techniques, SIGGRAPH 01, ACM Press, NY, NY pp. 277-288.

Litwinowicz, et al., "Animating images with drawings" Proc $21^{st}$ Annual Conf. on Computer Graphics & Interactive Tech. SIGGRAPH 1994, ACM Press, NY, NY 409-412.

Yoo, et al., "Concept formation in numeric domains" Proc. 1995 ACM $23^{rd}$ Annual Conf. on Computer Science, ACM Press, NY, NY, 36-41.

Chua, C; Neumann, U., "A layered approach to deformable modeling and animation", Proceedings of the Fourteenth Conference on Computer Animation, Nov. 7-8, 2001, pp. 184-191.

Ruthkrantz and Wojdel, "A Text Based Talking Face," Lecture Notes in Computer Science, vol. 1902, Jan. 2000, pp. 327-332.

Cruickshank, L. et al., "Facilitating the Evolution of a User Driven Iconotextual Internet Patois," Digital Creativity, vol. 10, No. 2, Jun. 1999, pp. 79-89 (11).

Jorn Ostermann, "Animated Talking Head with Personalized 3d Head Model", 1998, Journal of VLSI Signal Processing 20, pp. 97-105.

Delorie, "Why HTML Mail is Evil", dowloaded from the internet, copyright Mar. 1999, pp. 1-7, http:www.delorie.com/listserv/mime.

Bonamico et al., "Virtual Talking Heads for Tele-Education Application", in Proceedings of SSGRR 2001 Int. Conf. on Advances in Infrastructure for Electronic Business, Science, and Education on the Internet, L'Aquila, Italy, Aug. 2001, pp. 1-8.

Yamada, A.; Ohta, M., "Visual text reader for virtual image communication on networks," IEEE First Workshop on Multimedia Signal Processing, 1997, pp. 495-500, Jun. 23-25, 1997.

Business Editors, & High-Tech Writers, "Life F/X Inc. Introduces Strategy for Web Success", Business Wire, New York: Feb. 1, 2000. pp. 1-3.

Levinson, RFC 2392, "Content-ID and Message-ID Uniform Resource Locators," pp. 1-6, 1998.

* cited by examiner

*FIG. 6*

Welcome to Message!

Fill in the appropriate fields, and press the "Generate Message" button.

- Sender's name:
- Sender's email:
- Subject:
- Recipient's email: joedoe@att.com
- Select the character who will deliver your Message: Baldine
- Type your email message here:

> Hi there ☺, how are you today? It is raining ☹ so I am sad.

Would you like to get a copy of this Message? yes

[Reset the Form] [Generate Message]

THE CHARACTERS
- Britany
- Baldine
- Emperor
- Glenn
- Tom

Insert these emotions at the point in the text where you would like the expression to occur.

Location: http://www.Message.att.com

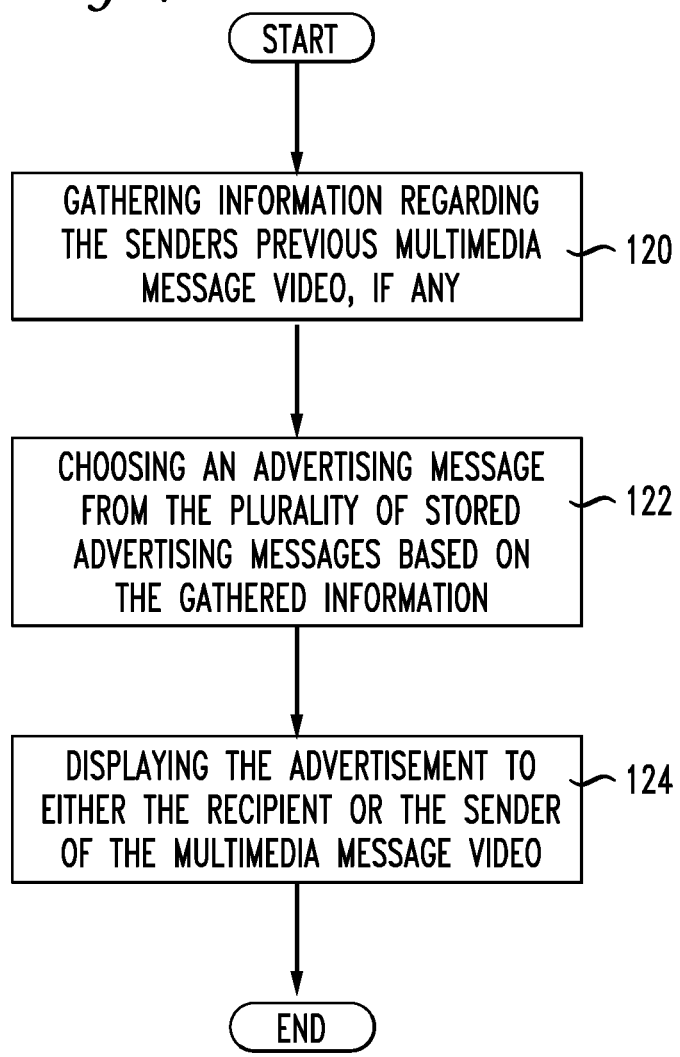

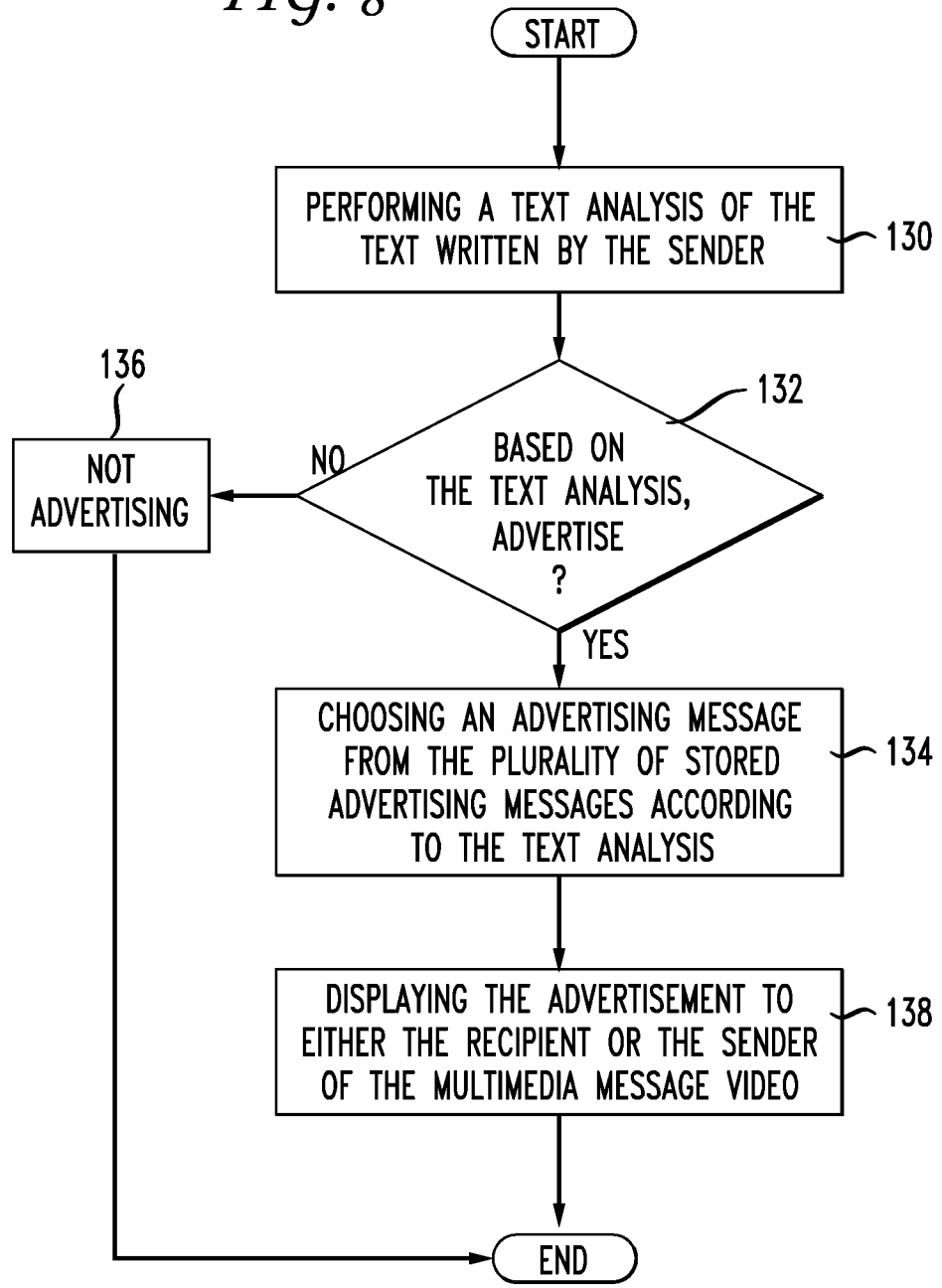

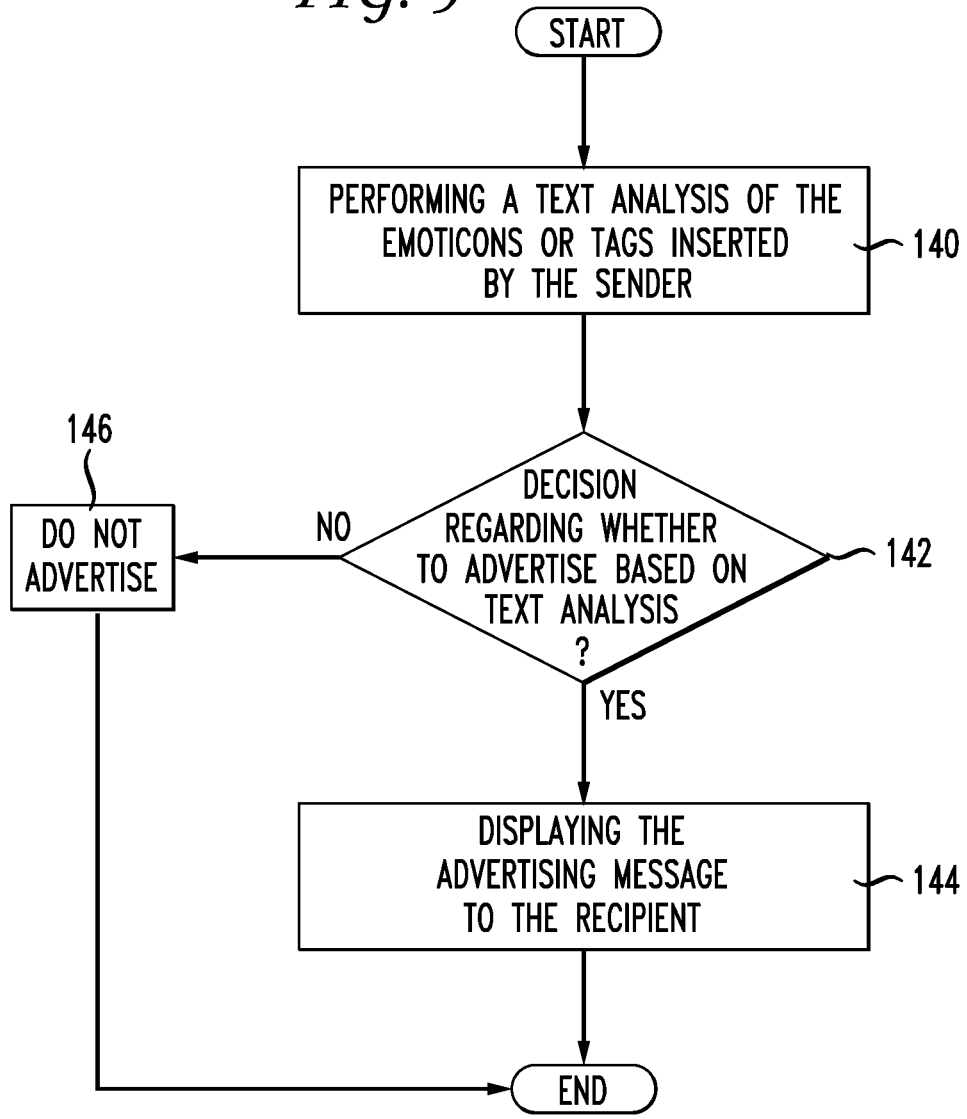

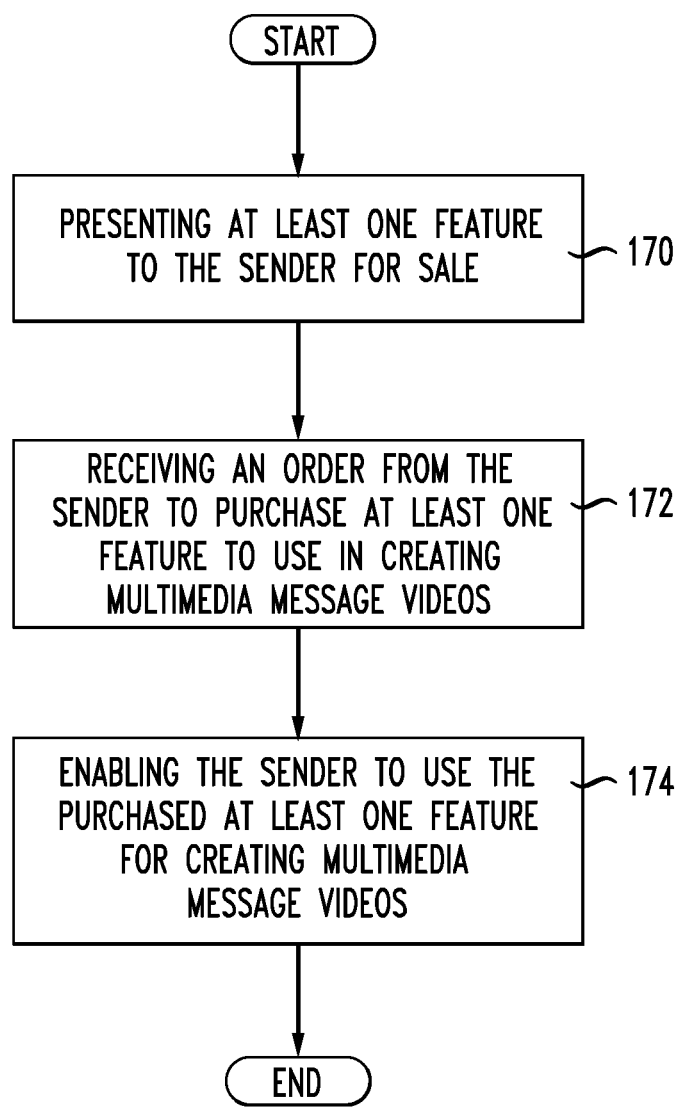

SYSTEM AND METHOD OF MARKETING USING A MULTI-MEDIA COMMUNICATION SYSTEM

PRIORITY APPLICATION

The present application is a division of U.S. patent application Ser. No. 09/999,525, filed Nov. 2, 2001, which claims priority to U.S. Patent Application No. 60/245,521 filed Nov. 3, 2000, the contents of which are incorporated herein in their entirety.

RELATED APPLICATIONS

The present application is related to the following U.S. patent applications: Ser. No. 10/003,094, filed Nov. 2, 2001, now U.S. Pat. No. 7,203,648; Ser. No. 11/259,883, filed Oct. 27, 2005; Ser. No. 11/679,905, filed Feb. 28, 2007; Ser. No. 10/003,091, filed Nov. 2, 2001, now U.S. Pat. No. 6,976, 082; Ser. No. 11/212,267, filed Aug. 27, 2005, now U.S. Pat. No. 7,203,759; Ser. No. 11/679,911, filed Feb. 28, 2007; Ser. No. 10/003,350, filed Nov. 2, 2001, now U.S. Pat. No. 6,990,452; Ser. No. 11/214,666, filed Aug. 30, 2005; Ser. No. 10/003,093, filed Nov. 2, 2001, now U.S. Pat. No. 7,035,803; Ser. No. 11/276,556, filed Mar. 6, 2006, now U.S. Pat. No. 7,177,811; Ser. No. 11/615,079, filed Dec. 22, 2006; Ser. No. 10/003,092, filed Nov. 2, 2001; Ser. No. 09/999, 526, filed Nov. 2, 2001, now U.S. Pat. No. 6,963,839; Ser. No. 11/195,934, filed Aug. 3, 2005; and Ser. No. 09/999,505, filed Nov. 2, 2001; Ser. No. 12/013,025, filed Jan. 11, 2008; Ser. No. 12/013,038, filed Jan. 11, 2008; Ser. No. 12/013, 055, filed Jan. 11, 2008; Ser. No. 12/013,072, filed Jan. 11, 2008; Ser. No. 12/013,098, filed Jan. 11, 2008; Ser. No. 12/013,106, filed Jan. 11, 2008; Ser. No. 12/013,115, filed Jan. 11, 2008. These applications are commonly assigned and are hereby incorporated by reference herein in their entireties.

BACKGROUND OF THE INVENTION

1. Field of the Invention

The present invention relates to multi-media messages and more specifically to a system and method of advertising using multi-media messages where an animated entity audibly delivers messages created by a sender using text-to-speech technologies.

2. Discussion of Related Art

There is a growing popularity for text-to-speech ("TTS") enabled systems that combine voice with a "talking head" or a computer-generated face that literally speaks to a person. Such systems improve user experience with a computer system by personalizing the exchange of information. Systems for converting text into speech are known in the art. For example, U.S. Pat. No. 6,173,263 B1 to Alistair Conkie, assigned to the assignee of the present invention, discloses a system and method of performing concatenative speech synthesis. The contents of this patent are incorporated herein by reference.

One example associated with the creation and delivery of e-mails using a TTS system is LifeFX™'s Facemail™. FIG. 1 illustrates how a sender creates a message using the LifeFX™ system. A window 10 presents fields for inserting the sender's e-mail address 12 and the recipient's e-mail address 14. Standard features such as control buttons 16 for previewing and delivering the message are provided. A standard subject line is also provided 18. The sender chooses from a variety of faces 20 to deliver the message. The currently chosen face 22 appears in the window 10 as well. The sender inserts the message text as with a traditional e-mail in a text area 24 and a box 26 below the text area gives illustrations of some of the available emoticons, explained further below.

This system enables a sender to write an e-mail and choose a talking head or "face" to deliver the e-mail. The recipient of the e-mail needs to download special TTS software in order to enable the "face" to deliver the message. The downloaded software converts the typewritten e-mail from the e-mail sender into audible words, and synchronizes the head and mouth movements of the talking head to match the audibly spoken words. Various algorithms and software may be used to provide the TTS function as well as the synchronization of the speech with the talking head. For example, the article, "Photo-realistic Talking-heads From Image Samples," by E. Cosatto and H. P. Graf, *IEEE Transactions on Multimedia*, September 2000, Vol. 2, Issue 3, pages 152-163, describes a system for creating a realistic model of a head that can be animated and lip-synched from phonetic transcripts of text. The contents of this article are incorporated herein by reference. Such systems, when combined with TTS synthesizers, generate video animations of talking heads that resemble people. One drawback of related systems is that the synthesized voice bears no resemblance to the sender voice.

The LifeFX™ system presents the user with a plurality of faces 20 from which to choose. Once a face is chosen, the e-mail sender composes an e-mail message. Within the e-mail, the sender inserts features to increase the emotion showed by the computer-generated face when the e-mail is "read" to the e-mail recipient. For example, the following will result in the message being read with a smile at the end: "Hi, how are you today? :-)". These indicators of emotion are called "emoticons" and may include such features as: :-( (frown); -o (wow); :-x (kiss); and ;-) (wink). The e-mail sender will type in these symbols which are translated by the system into the emotions. Therefore, after composing a message, inserting emoticons, and choosing a face, the sender sends the message. The recipient will get an e-mail with a notification that he or she has received a facemail and that they will need to download a player to hear the message.

The LifeFX™ system presents its emoticons when delivering the message in a particular way. For example, when an emoticon such as a smile is inserted in the sentence "Hi, Jonathon, :-) how are you today?" the "talking head" 22 speaks the words "Hi, Jonathan" and then stops talking and begins the smiling operation. After finishing the smile, the talking head completes the sentence "how are you today?"

The LifeFX™ system only enables the recipient to hear the message after downloading the appropriate software. There are several disadvantages to delivering multi-media messages in this manner. Such software requires a large amount of disc space and the recipient may not desire to utilize his or her space with the necessary software. Further, with viruses prevalent on the Internet, many people are naturally reluctant to download software when they are unfamiliar with its source.

FIG. 2 illustrates a received Facemail™ 40. The chosen talking head 22 delivers the message. Buttons such as "say again" 42, "new" 44, "forward" 26, "reply" 48, "reply all" 50, and "show text" 52 enable the recipient to control to some degree how the message is received. Buttons 42, 44, 46, 48 and 50 are commonly used button features for controlling messages. Button 52 allows the user to read the text of the message. When button 52 is clicked, the text of the message is shown in a window illustrated in FIG. 3. A separate window 54 pops up typically over the talking head 22 with the text. When the window is moved or does not cover the talking head, the sound continues but if the mouth of the talking head is showing, it is clear that when the text box is up, the mouth stops moving.

SUMMARY OF THE INVENTION

What is needed in the art is a system and method to enable targeted advertising using multi-media messages using TTS technology for delivering messages by an animated entity. The present invention addresses the need in the art for a system and method of presenting advertising messages in the context of TTS multi-media messages.

The first embodiment of the present invention relates to a method of advertising in a multi-media message. The multi-media message is prepared by a sender and delivered by an animated entity. The method uses a plurality of stored advertising messages from which to choose an advertising message to display. The method comprises gathering information regarding the sender's current and/or previous multi-media messages, if any, and choosing an advertising message from the plurality of stored advertising messages based on the gathered information. The chosen advertising message is displayed to either the sender or the recipient of the multi-media message. The information may relate to the sender's previous emoticons used, templates used, a trend of messages created by the sender, or other information that may be gained based on the sender's previous use of multi-media messages.

The information may also relate to recipient data. The recipient data may be gleaned from the text of the message (the tone of the message through a text analysis, for example), the name of the recipient (male or female), or previous messages sent to that recipient. The system may use the recipient data exclusively or in connection with the sender data to present advertisements.

In another aspect of the first embodiment of the present invention, other information associated with a current multi-media message may be used to determine and select advertisements associated with that multi-media message. For example, a text analysis may be performed of the text written by the sender in order to choose an appropriate advertising message from a plurality of stored advertising messages. As an example, if from the text analysis it is clear that the message relates to an offer to sell a computer, an advertisement related to computers may be chosen.

In yet another aspect of the first embodiment of the present invention, the information used for choosing an advertising message may relate to the emoticons or other music or video tags inserted in the text of the message by the sender. In this regard, the system analyzes the inserted emoticons or tags to determine, for example, whether the message is a positive message or a negative message. From this analysis, the system chooses an advertisement to match as closely as possible the tone of the message. The decision on which advertisements to insert into the multi-media message may depend on one or more of the parameters disclosed herein, as well as on the language in which the receiver chooses to receive the message, in order to optimize the targeting of advertisements within the context of multi-media messages.

The second embodiment of the present invention relates to a method of providing features available for purchase by the sender for use in creating multi-media messages. The method comprises presenting at least one feature to the sender for sale. The features presented to the sender may relate to any aspect of the process of creating a multi-media message using text-to-speech technology and animated entity for delivering a text message. The method further comprises receiving an order from the sender to purchase at least one feature to use in creating multi-media messages. Once purchased, the method comprises enabling the sender to use the purchased feature for creating multi-media messages.

The features available for sale may comprise, for example, certain animated entities such as a famous character, actor, professionally created entities and the like. The features may also relate to accessories to associate with the animated entity such as sunglasses, hats, earrings, make-up, scarves or cloths. Furthermore the features may relate to the background effects such as video templates, emoticons, animation, backgrounds, or sound effects.

The sender may purchase any of these features for continuous use, for use in a limited number of multi-media messages, or for a limited amount of time. Furthermore, additional arrangements are contemplated such that the distributor of, for example, sunglasses that may be associative with a soon-to-be released movie may offer the sender a free pair of sunglasses if the sender uses the particular sunglasses within a certain number of multi-media messages before the debut of the movie.

BRIEF DESCRIPTION OF THE DRAWINGS

The foregoing advantages of the present invention will be apparent from the following detailed description of several embodiments of the invention with reference to the corresponding accompanying drawings, in which:

FIG. 4(*b*) illustrates a low-bandwidth version of the system shown in FIG. 4(*a*);

FIG. 6 illustrates an example window for creating a multi-media message;

FIG. 7 illustrates a method according to the first embodiment of the invention;

FIG. 8 shows another method according to the first embodiment of the invention;

FIG. 9 shows another variation on the first embodiment of the invention related to the timing of advertisements in a multi-media message;

FIG. 12 illustrates a variation on the second embodiment of the invention.

DETAILED DESCRIPTION OF THE INVENTION

The present invention may be best understood with reference to the accompanying drawings and description herein. The basic system design supporting the various embodiments of the invention is first disclosed. A system comprises a TTS and an animation server to provide a multi-media message service over the Internet wherein a sender can create a multi-media message presentation delivered audibly by an animated entity.

Figure 1:
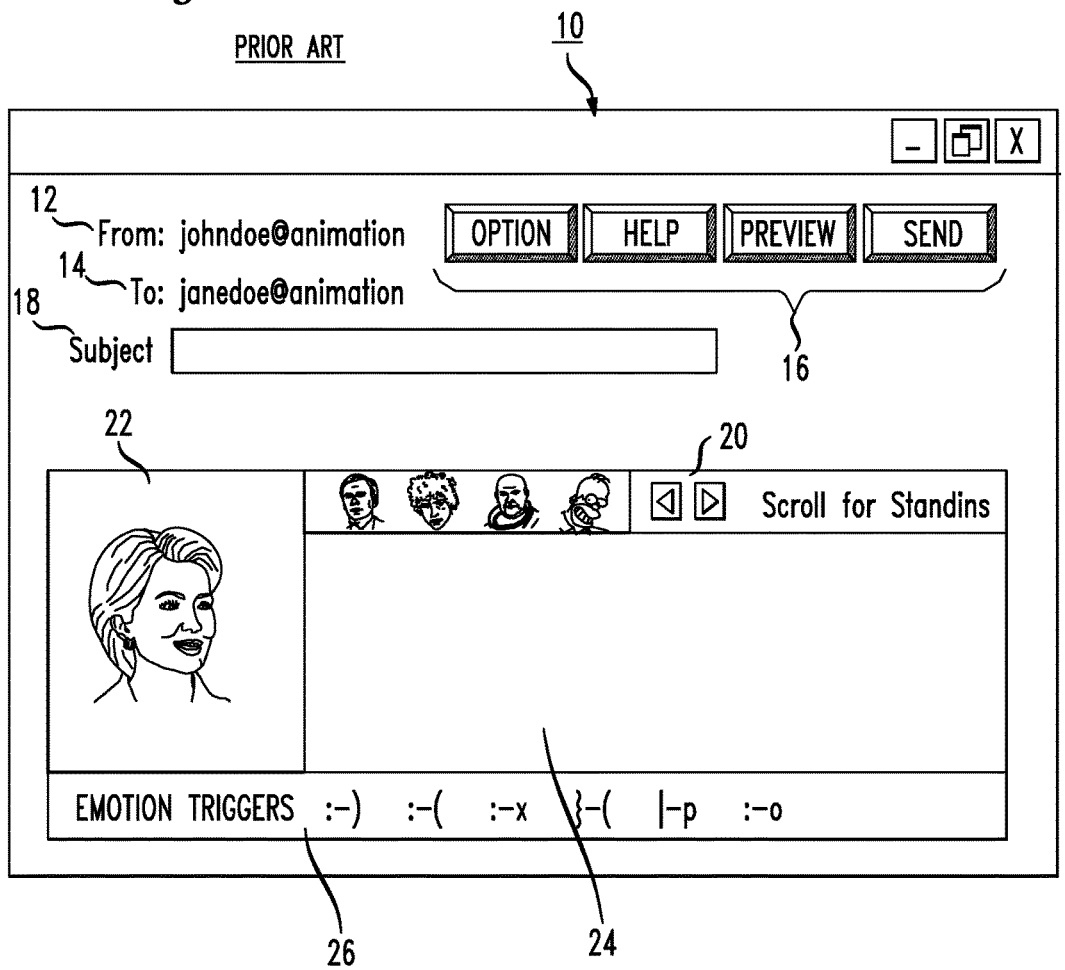
FIG. 1 illustrates a prior art window for creating a multi-media message.
Figure 2:
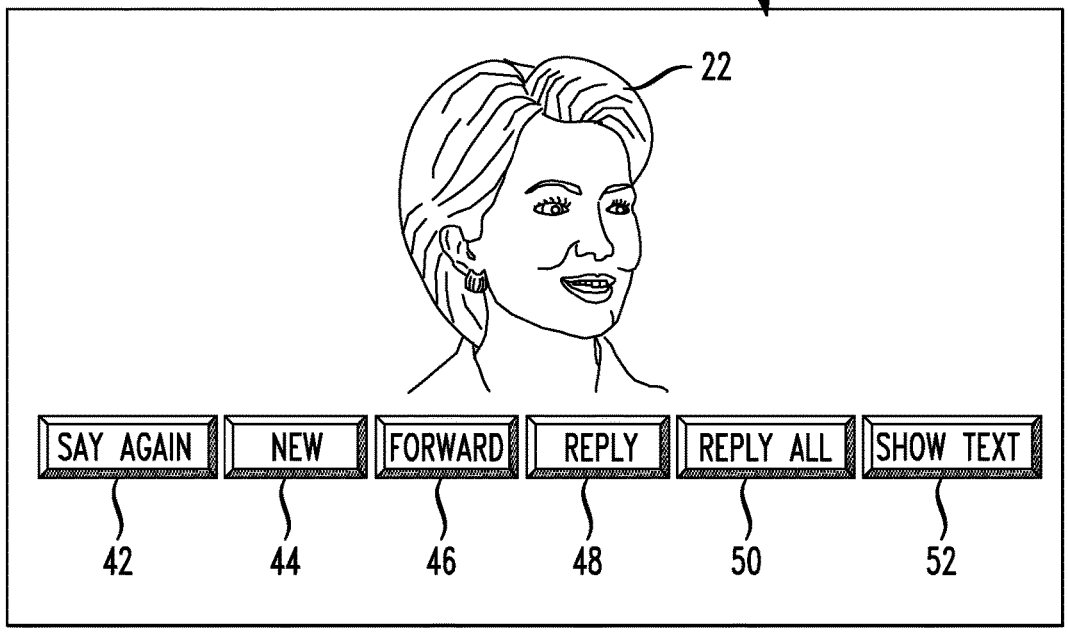
FIG. 2 illustrates a prior art window viewed by a recipient of a multi-media message.
Figure 3:
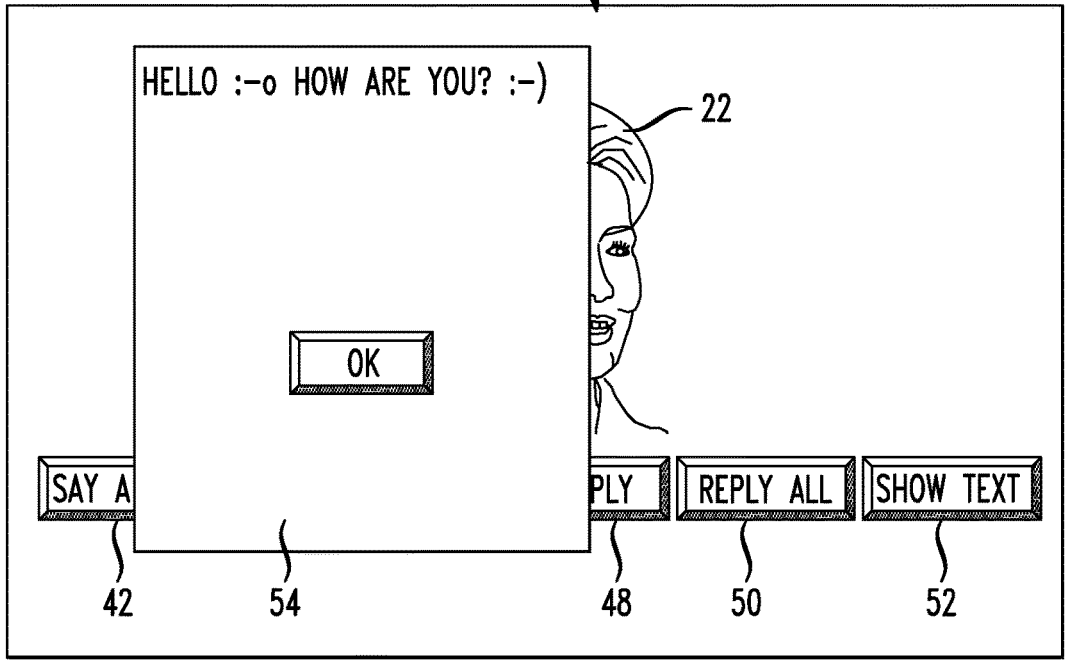
FIG. 3 illustrates a prior art window in response to a recipient of a multi-media message clicking on a "show text" button.
Figure 4A:
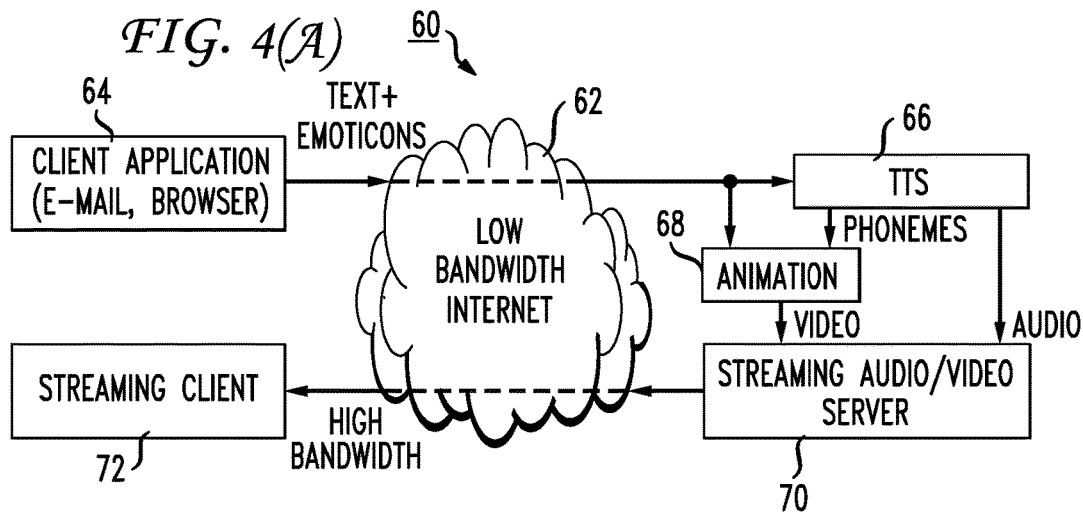
FIG. 4(*a*) illustrates the basic architecture of the system according to an embodiment of the present invention.

FIG. 4(a) illustrates a high-bandwidth architecture 60 associated with the embodiments of the invention. The system 60 delivers a hyper-text mark-up language (HTML) page through the Internet 62 (connected to a web server, not shown but embodied in the Internet 62) to a client application 64. The HTML page (shown by way of example in FIG. 6) enables the sender to create a multi-media message. The client application may be, for example, a web browser such as Microsoft's Internet Explorer®. Other client applications include e-mail and instant messaging clients. The sender creates the multi-media message using the HTML page.

The web server receives the composed multi-media message, which includes several components that are additional to a regular e-mail or instant message. For example, a multi-media message includes a designation of an animated entity for audibly delivering the message and emoticons that add emotional elements to the animated entity during the delivery of the message. The HTML page delivered to the client terminal enables the sender to manipulate various buttons and inputs to create the multi-media message.

Once the sender finishes creating the multi-media message and sends the message, the Internet 62 transmits the message text with emoticons and other chosen parameters to a text-to-speech (TTS) server 66 that communicates with an animation or face server 68 to compute and synchronize the multi-media message. The transmission of the text-to-speech data may be accomplished using such methods as those disclosed in U.S. Pat. No. 6,173,250 B1 to Kenneth Jong, assigned to the assignee of the present invention. The contents of this patent are incorporated herein by reference.

The animation server 68 receives phonemes associated with the sender message and interpreted by the TTS server 66, including the text of the subject line and other text such as the name of the sender, as well as other defined parameters or data. The animation server 68 processes the received phonemes, message text, emoticons and any other provided parameters such as background images or audio and creates an animated message that matches the audio and the emoticons. An exemplary method for producing the animated entity is disclosed in U.S. Pat. No. 5,995,119 to Cosatto et al. ("Cosatto et al."). The Cosatto et al. patent is assigned to the assignee of the present invention and its contents are incorporated herein by reference. Cosatto et al. disclose a system and method of generating animated characters that can "speak" or "talk" received text messages. Another reference for information on generating animated sequences of animated entities is found in U.S. Pat. No. 6,122,177 to Cosatto et al. ("Cosatto et al. II"). The contents of Cosatto et al. II are incorporated herein by reference as well.

The system 60 encodes the audio and video portions of the multi-media message for streaming through a streaming audio/video server 70. In a high-bandwidth version of the present invention, as shown in FIG. 4(a), the server 70 streams the multi-media message to the streaming client 72 over the Internet 62. One of ordinary skill in the art will understand and be cognizant of a variety of TTS servers and TTS technologies that may be optimally used for converting the text to speech. The particular implementation of TTS technologies is not relevant to the present invention. One of ordinary skill in the art will understand and be cognizant of a variety of animation servers and animation technologies that may be optimally used for converting phonemes and emoticons into talking entities, preferably faces. The particular implementation of animation technologies is not relevant to the present invention.

Figure 4B:
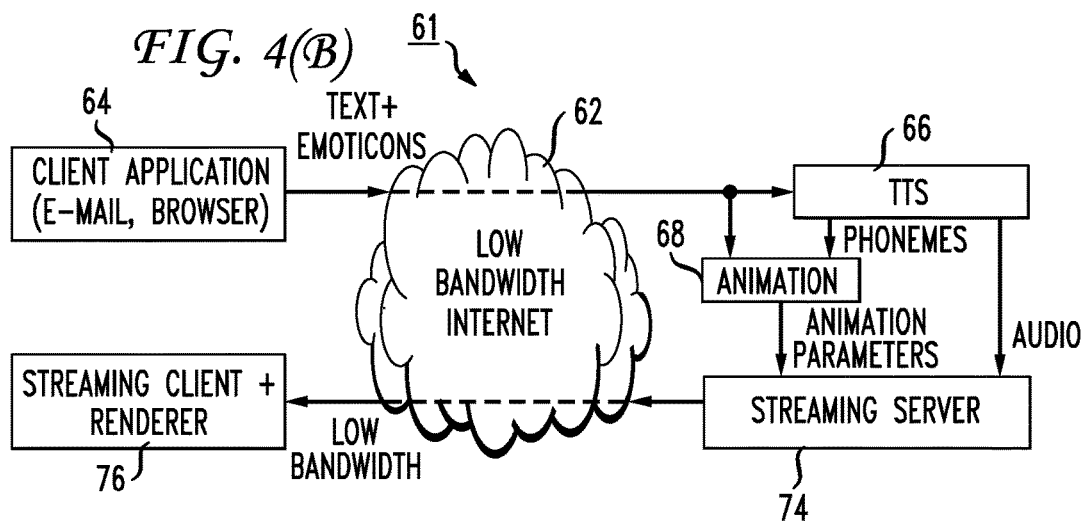

FIG. 4(b) illustrates a low-bandwidth system 61 of the present invention. In this variation, the animation server 68 produces animation parameters that are synchronized with the audio produced from the TTS server 66. The audio and animation parameters are encoded and transmitted by the streaming server 74 over a lower bandwidth connection over the Internet 62. The streaming client 76 in this aspect of the invention differs from the streaming client 72 of FIG. 4(a) in that client 76 includes rendering software for rendering the animation on the client device using the streamed animation parameters provided from the streaming server 74. Furthermore, the client includes a TTS synthesizer that synthesizes the audio. In this manner, the systems disclosed in FIGS. 4(a) and 4(b) provide both a high-bandwidth and a low-bandwidth option for all users.

A further variation of the invention applies when the client device includes the animation or rendering software. In this case, the client device 72, 76 can receive a multi-media message e-mail, with the message declared as a specific multipurpose Internet mail extension (MIME) type, and render the animation locally without requiring access to a central server or streaming server 70, 74. In one aspect of the invention, the rendering software includes a TTS synthesizer with the usable voices. In this case, the recipient device 72, 76 receives the text (very little data) and the face model (several kb), unless it is already stored in a cache at the receiver device 72, 76. If the receiver device 72, 76 is requested to synthesize a voice different from the ones available at its TTS synthesizer, the server 74 downloads the new voice.

High quality voices typically require several megabytes of disk space. Therefore, if the voice is stored on a streaming server 74, in order to avoid the delay of the huge download, the server 74 uses a TTS synthesizer to create the audio. Then, the server 74 streams the audio and related markup information such as phonemes, stress, word-boundaries, bookmarks with emoticons, and related timestamps to the recipient. The recipient device 76 locally renders the face model using the face model and the markup information and synchronously plays the audio streamed from the server.

Figure 5:
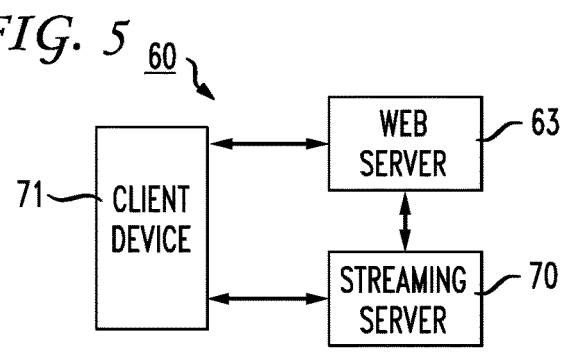
FIG. 5 shows example architecture for delivering the multi-media message.

When the recipient receives an e-mail message associated with the multi-media message, the message is received on a client device 71 such as that shown in FIG. 5. FIG. 5 illustrates a different view of system 60. The client device may be any one of a desktop, laptop computer, a wireless device such as a cell phone, 3Com's Palmpilot® or personal data assistant and the like. The particular arrangement of the client device 71 is unimportant to the present invention. The multi-media message may be delivered over the Internet, via a wireless communication system such as a cellular communication system or via a satellite communication system.

The multi-media message delivery mechanism is also not limited to an e-mail system. For example, other popular forms of communication include instant messaging, bulletin boards, I Seek You (ICQ) and other messaging services. Instant messaging and the like differ from regular e-mail in that its primary focus is immediate end-user delivery. In this sense, the sender and recipient essentially become interchangeable because the messages are communicated back and forth in real time. Presence information for a user with an open session to a well-known multi-user system enables friends and colleagues to instantly communicate messages back and forth. Those of skill in the art know various architectures for simple instant messaging and presence awareness/notification. Since the particular embodiment of the instant message, bulletin board, or I Seek You (ICQ) or other messaging service is not relevant to the general principles of the present invention, no further details are provided here. Those of skill in the art will understand and be able to apply the principles disclosed herein to the particular communication application. Although the best mode and preferred embodiment of the invention relates to the e-mail context, the multi-media messages may be created and delivered via any messaging context.

For instant messaging, client sessions are established using a multicast group (more than 2 participants) or unicast (2 participants). As part of the session description, each participant specifies the animated entity representing him. Each participant loads the animated entity of the other participants. When a participant sends a message as described for the e-mail application, this message is sent to a central server that animates the entity for the other participants to view or streams appropriate parameters (audio/animation parameters or audio/video or text/animation parameters or just text) to the participants that their client software uses to render the animated entity.

Further as shown in FIG. 5, when a client device 71 receives a request from the recipient to view a multi-media message, the client device 71 sends a hypertext transfer protocol (HTTP) message to the web server 63. As a response, the web server sends a message with an appropriate MIME type pointing to the server 70 at which point the server 70 streams the multi-media message to the client terminal for viewing and listening. This operation is well known to those of skill in the art.

In an alternate aspect of the invention, the client device 71 stores previously downloaded specific rendering software for delivering multi-media messages. As discussed above, LifeFX™ requires the recipient to download its client software before the recipient may view the message. Therefore, some of the functionality of the present invention is applied in the context of the client terminal 71 containing the necessary software for delivering the multi-media message. In this case, the animation server 68 and TTS server 66 create and synchronize the multi-media message for delivery. The multi-media message is then transmitted, preferably via e-mail, to the recipient. When the recipient opens the e-mail, an animated entity shown in the message delivery window delivers the message. The local client software runs to locally deliver the message using the animated entity.

Many web-based applications require client devices to download software on their machines, such as with the LifeFX™ system. As mentioned above, problems exist with this requirement since customers in general are reluctant and rightfully suspicious about downloading software over the Internet because of the well-known security problems such as virus contamination, trojan horses, zombies, etc. New software installations often cause problems with the existing software or hardware on the client device. Further, many users do not have the expertise to run the installation process if it gets even slightly complicated e.g., asking about system properties, directories, etc. Further, downloading and installing software takes time. These negative considerations may prevent hesitant users from downloading the software and using the service.

Some Java-based applications are proposed as a solution for the above-mentioned problems but these are more restrictive due to security precautions and can't be used to implement all applications and there is no unified Java implementation. Therefore, users need to configure their browsers to allow Java-based program execution. As with the problems discussed above, a time-consuming download of the Java executable for each use by users who do not know if they really need or like to use the new application may prevent users from bothering with the Java-based software.

Accordingly, an aspect of the present invention includes using streaming video to demonstrate the use of a new software application. Enabling the user to preview the use of a new software application solves the above-mentioned these problems for many applications. Currently, almost all client machines have a streaming video client such as Microsoft's Mediaplayer® or Real Player®. If not, such applications can be downloaded and configured with confidence. Note that the user needs to do this only once. These streaming video receivers can be used to receive and playback video on the client's machine.

According to this aspect of the present invention, shown by way of example in FIG. 5, a user may wish to preview a multi-media message before downloading rendering software on the client device 71. If such is the case, the user enters into a dialogue with the streaming server 70 and requests a preview or demonstration of the capabilities of the application if the rendering software were downloaded. The streaming server 70 transmits to the client device 71 a multi-media message showing dynamic screen shots of the application as if it is running on the user's machine. As an example, if the new application would have the capability to show a three-dimensional view of a room based on vector graphics, the streaming video displays the three-dimensional output of the application on the user's monitor as video. Most existing players allow the users to control the video playback by clicking on buttons or the like on an HTML page. This provides an interactive feeling for the user if needed without loading any new or suspicious software.

Therefore, an aspect of the present invention enables the user, before downloading rendering software for presenting multi-media messages using an animated entity, to request a preview of the multi-media message streamed to the client as a video and presented on a player such as the Microsoft Mediaplayer® or Real Player® downloaded from a web server 63. If the user so desires, he or she can then download the rendering software for enjoying the reception of multi-media messages.

FIG. 6 shows an example of a template for the sender to use to create a multi-media message. A message-creation window 80 includes basic e-mail-related features such as fields for inserting a sender name 82 and sender e-mail address 84. A subject line 86 and recipient address field 88 are also provided. The sender enters the text of the message within a standard text field 92. Various animated entities 94 are available from which the sender may choose (90) for delivering the message. Typically the animated entities are faces as shown in FIG. 6, but they may be any entity such as an animal, car, tree, robot, or anything that may be animated.

The sender may also insert emoticons 103 into the text of the message. The system includes predefined emoticons 96, such as ":-)" for a smile, "::-)" for a head nod, "*w*" for an eye wink, and so forth. The predefined emoticons are represented either as icons or as text, such as ";-)". As shown in FIG. 6, the window 80 includes a sample group of emoticon icons 96. The sender inserts an emoticon into a text message at the location of the cursor 102 by clicking on one of the emoticon icons 100. The sender may also type in the desired emoticon as text. Emoticon icons 96 save the sender from needing to type three keys, such as ":" and "-" and ")"

for a smile. The icons 96 may be either a picture of, say, a winking eye or a icon representation of the characters ";-)" 100, or other information indicating to the sender that clicking on that emoticon icon will insert the associated emotion 103 into the text at the location of the cursor 102.

Once the sender composes the text of the message, chooses an animated entity 94, and inserts the desired emoticons 103, he or she generates the multi-media message by clicking on the generate message button 98. The animation server 68 creates an animated video of the selected animated entity 94 for audibly delivering the message. The TTS server 66 converts the text to speech as mentioned above. Emoticons 103 in the message are translated into their corresponding facial expressions such as smiles and nods. The position of an emoticon 103 in the text determines when the facial expression is executed during delivery of the message.

Execution of a particular expression preferably occurs before the specific location of the emoticon in the text. This is in contrast to the LifeFX™ system, discussed above, in which the execution of the smile emoticon in the text "Hello, Jonathan :-) how are you?" starts and ends between the words "Jonathan" and "how". In the present invention, the expression of the emoticon begins a predefined number of words or a predefined time before the emoticon's location in the text. Furthermore, the end of the expressions of an emoticon may be a predefined number of words after the location of the emoticon in the text or a predetermined amount of time after the location of the emoticon.

For example, according to an aspect of the present invention, the smile in the sentence "Hello, Jonathan :-) how are you?" will begin after the word "Hello" and continue through the word "how" or even through the entire sentence. The animated entity in this case will be smiling while delivering most of the message—which is more natural for the recipient than having the animated entity pause while executing an expression.

Furthermore, the starting and stopping points for executing expressions will vary depending on the expression. For example, a wink typically takes a very short amount of time to perform whereas a smile may last longer. Therefore, the starting and stopping points for a wink may be defined in terms of 0.1 seconds before its location in the text to 0.5 seconds after the location of the wink emoticon in the text. In contrast, the smile emoticon's starting, stopping, and duration parameters may be defined in terms of the words surrounding the emoticons.

The first embodiment of the invention relates to a method of presenting an advertising message associated with a multi-media message. The advertising message may be delivered to either the sender or the recipient. The multi-media message is created by the sender and delivered to the recipient by an animated entity. The general principle of the method relates to gathering as much information about the sender and recipient from the selection of elements and the text associated with the multi-media message. The information is used for targeted advertising.

FIG. 7 shows an example flow-graph of the first embodiment of the invention. The method comprises gathering information regarding the sender's previous multi-media messages, if any (120). The information may relate to options chosen such as sound or background images as disclosed in a related patent application incorporated herein. The previous multi-media message information may also include a text analysis of previous multi-media messages. Next, with the information from previous multi-media messages, the method comprises choosing an advertising message from the plurality of stored advertising messages based on the gathered information (122). The advertisement is displayed to either the recipient or the sender of the multi-media message (124).

As an example of this method, an analysis of previous messages between the sender and the recipient may reveal an ongoing discussion regarding building a home addition or an ongoing discussion regarding purchasing a vehicle. With this data, an appropriate advertisement is selected that is targeted to the need of the recipient or the sender. The information gathered may also relate to information regarding recipients of the sender's previous multi-media messages.

The advertisement in the multi-media message to the recipient may be delivered prior to, throughout, or following the reception of the multi-media message.

In another aspect of the first embodiment of the invention shown in FIG. 8, based on a text analysis of the current message, the method selects advertisements from a plurality of stored advertising messages to display to either the sender or the recipient. The method comprises performing a text analysis of the text written by the sender (130). Based on the text analysis, the system determines whether to advertise (132). In this regard, the text of the message may indicate that advertising is not appropriate or desirable according to the subject matter or tone of the message. If the system determines that it is appropriate to advertise, then the method comprises choosing an advertising message from the plurality of stored advertising messages according to the text analysis (134). The chosen advertising message is displayed to the sender or recipient of the multi-media message (138). If the system determines not to advertise, then the method comprises not advertising to the recipient (136).

Additional steps may include analyzing emoticons and/or other tags inserted into the text written by the sender. An example of this aspect of the invention is provided in FIG. 9. In general, emoticons or audio tags, video clip tags, or image tags may be inserted into the text of the message for a desired effect. Preferably, any of these inserted tags may be termed an "icon." Thus, an icon inserted into the text may be any feature or effect available to the sender in the creation of the multi-media-message. In the context of the present invention, each of these icons provides information useful for choosing an appropriate advertisement.

In addition to emoticon information, if other information is available for analysis, the method comprises choosing the advertising message according to the text analysis and any additional analysis. Since the sender is creating a multi-media message that may comprise manipulation of a variety of parameters, including the choice of the animated entity, there is much information to draw upon when targeting advertisements. The present invention envisions using any and all of this information for increased efficiency in advertising.

The system may use different advertising methods when analyzing the sender text and emoticons or other data for information for determining advertising. For example, performing the emoticon analysis may further comprise providing a score for each available emoticon and determining a value associated with all the emoticons in the sender text, wherein the chosen advertising message is based on the value. A database stores a plurality of advertisements and associated values such that a match may be made for each text message created by the sender.

Recipient information may be gathered as well. For example, the name in the text message, e-mail address, tone or text of the message, etc., may be useful in determining and crafting advertisements for the recipient. This information may be used exclusive of or in connection with the known sender information. Therefore, a personally tailored advertisement or offering may be presented to the recipient.

FIG. 9 illustrates this aspect of the method. The method comprises performing an analysis of the emoticons or icons inserted by the sender. The tags may refer to any feature or effect desired by the sender such as sound, images, or video clips (140). Next, the system determines whether to advertise based on the analysis (142). This aspect of the invention is important because advertising may be ineffective or damaging if presented with a message that has a highly negative connotation. For example, it may be more appropriate for no advertisement to accompany a message about a death in the family. In the analysis of the emoticons and tags inserted into the text, positive or negative connotations may be determined based on, for example, if frown emoticons or smile emoticons are used. If the system determines that advertising is appropriate, then the method comprises displaying an advertisement or product offering to the recipient (144). The selection of the advertisement or offering is preferably targeted based on the analysis and any known information about the sender and/or recipient. If the system determines not to advertise, then the method comprises not advertising to either the sender or recipient (146).

The above-described aspect of the first embodiment of the invention enables the advertiser to change advertisements throughout a message based on different tags or text analysis of the message. For example, a text message may have a sad portion and a happy portion. During the sad portion, text analysis, background music tags and emoticons may clearly indicate sadness or a somber mood. An advertisement may be displayed (if at all) to the recipient during this time that is appropriate for such an atmosphere. However, the sender may then change moods and the latter part of a message may be very cheerful and talk about, for example, an exciting beach vacation just taken. Background video clips and music and smiling emoticons all reflect this mood. In this case, different advertisements related to this mood may be included.

The effect of the text analysis may be, for example, if the sender describes a trip to a Hawaii beach and describes a surfing experience with the associated emoticons, music and images, the server can gather all of the information and determine that another trip is contemplated next summer to the same place. Advertisements therefore associated with airfare, hotel accommodations, car rental specials, dining, or the like can be provided to the sender or recipient. If either the sender or the recipient is planning another trip, the likelihood that they may explore a link to a desired product or service increases.

Other variations on how advertisements are chosen are also contemplated, such as gathering information about a recipient. For example, colors associated with or the subject matter of the advertisement or product/service offering may be varied depending on whether the recipient is male or female. The text of the message may indicate further information about the recipient such as vacation plans or trips just taken. Recipient-based information, including any other analysis or information, such as text analysis or which animated entity is chosen by the sender, combine to provide an accurate and effective means of choosing a recipient-focused advertisement or product/service offering. The advertisement may be tailored to the recipient through using the recipient's name, gleaned either from the recipient e-mail address or text in the message.

Another aspect of the first embodiment of the invention relates to the timing of delivery of the message. Preferably, a server receives the multi-media message created by the sender for the recipient. A period of time exists while the multi-media message is being delivered to the recipient. The recipient device, whether via computer or handheld wireless device, may have buffer memory that must be filled to a certain level before a streaming multi-media message can begin to be displayed. Preferably, while streaming the multi-media message to the recipient, and before a streaming client has a buffer filled to a predetermined level, the chosen advertisement is delivered to the recipient. There may be other periods of time as well during the preparation and streaming process of the multi-media message in which advertisements may be displayed. The format of the delivery of these advertisements to the recipient is also variable. For example, the system may use a standard banner ad format or the system may use the animated entity chosen for delivering the sender's multi-media message. In yet another variation of this aspect of the invention, the advertisement may be delivered to the recipient after the recipient has received the multi-media message.

Figure 10:
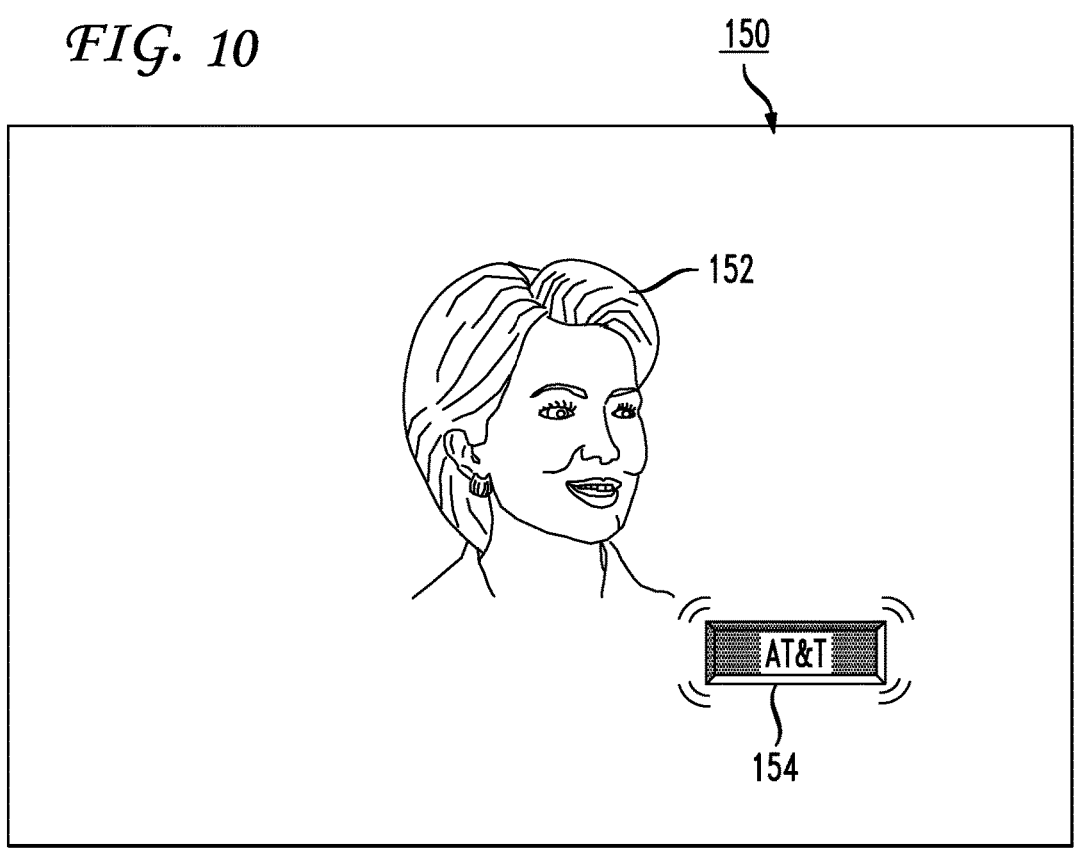
FIG. 10 illustrates an advertisement associated with an animated entity.

Advertisements may be shown in the background of an animated entity as part of a background image or as a small icon or logo next to the animated entity. The advertising icon may also be linked to the animated entity such that the icon's movement or intensity may be variable throughout the presentation of the multi-media message. FIG. 10 illustrates this feature of the invention. The multi-media message window 150 includes the animated entity 152 that is delivering the message. An advertisement 154 is included in any location in the window 150. The interaction between the advertisement 154 and the multi-media message may be, for example, such that the advertisement 154 moves with the movement of the animated entity 152, or that the advertisement increases in size and intensity, either by color or brightness or some other feature, depending on the portion of the text being delivered and the associated emoticons. For example, if a large smile emoticon is inserted in the text of the message, then the advertisement may become more intense during that period of time such that the recipient's attention is drawn to the advertisement during a positive portion of the multi-media message. The advertising icon preferably includes a link such that when the recipient clicks on the link, the advertiser's web-page opens for the recipient to browse and shop.

Figure 11:
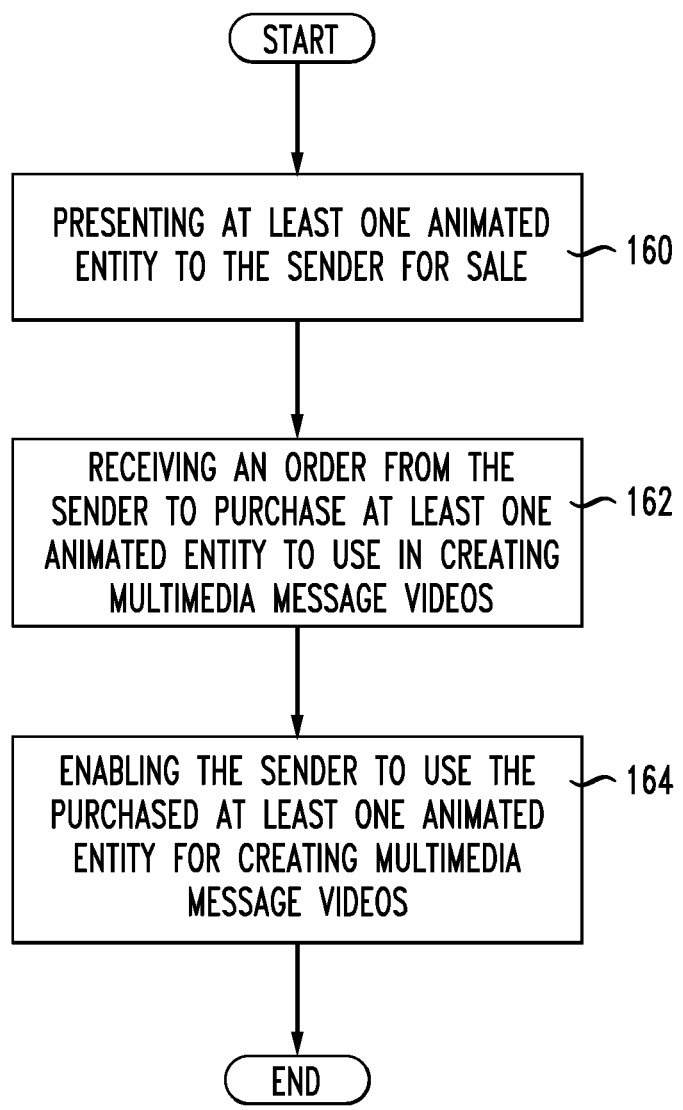
FIG. 11 illustrates a method according to the second embodiment of the invention.

The second embodiment of the present invention is illustrated by way of example in FIG. 11. FIG. 11 relates to a method of providing sender-selectable animated entities when creating a multi-media message. Various animated entities are presented to a sender. Some of these animated entities may be images of famous people or specially created images. The owners of such images may design the images to sell or license them for a sender's general or specific use in creating multi-media message. Accordingly, the second embodiment of the present invention relates to the sale of animated entities for multi-media messages and the sale of other features associated with multi-media messages.

The method comprises presenting at least one animated entity to the sender for sale (160), and receiving an order from the sender to purchase at least one animated entity to use in creating a multi-media message (162). Once purchased, the method further comprises enabling the sender to use the purchased at least one animated entity for creating a multi-media message (164).

A variation on the second embodiment of the invention relates to the step of receiving an order from the sender to purchase at least one animated entity. In this variation, the method further comprises receiving an order from the sender to purchase at least one animated entity for use in a limited number of multi-media messages. Receiving an order from the sender to purchase at least one animated entity may further comprise receiving an order from the sender to purchase at least one animated entity for use within a limited amount of time. In this regard the sender may desire to use a specific animated entity a large number of times or only a few times. Different pricing plans enable the sender to have options to choose from.

In addition to the animated entity being available for sale, additional features and accessories may also be for sale. In this variation of the second embodiment of the invention, the method comprises providing features for use by a sender in creating a multi-media message for a recipient, the multi-media message being delivered audibly by the animated entity. This variation is illustrated in FIG. 12. The method comprises presenting at least one feature to the sender for sale (170) and receiving an order from the sender to purchase at least one feature to use in creating multi-media messages (172). Once purchased, the method comprises enabling the sender to use the purchased at least one feature for creating multi-media messages (174).

The available features for sale to the sender comprise multi-media message templates, emoticons, animation, backgrounds, and sound effects. Other features such as accessories like sunglasses, ear-rings, hats, earrings, makeup, scarves, clothes or other facial features may also be available. Single-fee plans, such as paying $1 per month, may also be offered for unlimited use of the features of the invention.

The sender-created multi-media message template may also be available for use at kiosks at theme parks, sporting events, for a local community or associated with a particular event such as a movie. For example, the present invention contemplates associating a particular template for a particulate baseball team. Kiosks at the baseball field are available for use by visitors. The animated entities available for use from the kioske are baseball players from the teams playing that day or from the home team. A sender can then use the kioske to prepare and send a multi-media message using the chosen baseball player for delivery. Such a site may also be available over the Internet where a baseball teams web site, for example, provides the option for the sender to enter in his or her return email and send an email using one of the players as the entity delivering the message.

In another aspect of the invention, the available characters for delivering the multi-media message are those in a movie, such as Star Wars®. In this regard, high-quality models can be created and the use of these models with multi-media message templates with background music, entities, background video or background images and emoticons can all reflect a particular theme associated with a movie. These kinds of templates are then available for users either on a movie promotion web site or via a selectable set of templates available through the sender's e-mail application.

The multi-media creation template associated with an event will have tailored parameters such as emoticons specially designed for each character or animated entity that is selectable. Therefore, as an example, if Darth Vader® is a selectable animated entity to deliver a message, then the emoticons that are inserted will be tailored to his personality. Thus, the presentation of the message by Darth Vader® will be more realistic to the recipient. Further, background music, videos, images, etc. will all be tailored for the particular template event.

Accordingly, a method according to this aspect of the invention comprises a method of enabling a sender to create a multi-media message associated with a particular event, the method comprising presenting the sender with an option to select a multi-media message creation template, the creation template having animated entities and other features associated with the event. Upon the sender selecting the option to use the creation template, receiving the sender selection of parameters, receiving the sender message and delivering the multi-media message to a recipient.

In this manner, the use of multi-media messages promotes are particular event such as a movie, or a sporting team or any other particular event that lends itself to promotion using a group of famous people.

Concepts from the present invention may be used for electronic bulk and targeted marketing. In a variation, the text and animation of an advertisement message is created. The name of the recipient is inserted into the message such that a personalized message is created. The computer server computes the multi-media advertising message and sends an e-mail or other message to the recipient as soon as it is ready. In order to increase the effectiveness of the message, the advertisement may be presented within a web page related to the message of the advertisement.

For example, according to this aspect of the invention, the system creates the body of the advertisement as one video and for each a recipient a separate video containing just the greeting like 'Hello Mr. Smith. Today, we like to show you our new multi-media message application'. Then, the server combines the 2 videos into one for each customer. The transition between the two videos is masked by showing an intermediate frame that might show a picture of the product. Combining the videos may be achieved on the server using any video processing software or on the client computer using multi-media synchronization languages like SMIL.

Although the above description may contain specific details, they should not be construed as limiting the claims in any way. Other configurations of the described embodiments of the invention are part of the scope of this invention. For example, the present invention is described in the context of e-mail multi-media messages. However, the present invention has application in any message delivery system. For example, in an instant messaging has become a very popular type of communication over the Internet for over a wireless communication link. The present invention has applicability in other contexts such as instant messaging or any other context in which messages are delivered. Accordingly, the appended claims and their legal equivalents should only define the invention, rather than any specific examples given.

The invention claimed is:

1. A method of presenting a message associated with a multimedia message, the multimedia message being prepared by a sender using text and emoticons inserted in the multimedia message, and delivered audibly by an animated entity, the method using a plurality of stored characters from which to compute a message video to display, the method comprising:

performing, via a processor, an emoticon analysis of the emoticons by providing scores for the emoticons in the multimedia message and determining a value associated with all the emoticons in the multimedia message based on the scores;

generating a message video according to the emoticon analysis, the value, and based on text-to-speech audio generated from the text inserted into the multimedia message, the generating further comprising synchronizing the text-to-speech audio with animation data from an animation server to yield the message video;

choosing an advertisement from a plurality of stored advertisements according to the emoticon analysis, wherein the advertisement is chosen based on the value; and transmitting the advertisement and the message video for display on a user device.

2. A non-transitory computer-readable medium storing instructions which, when executed by a computing device, cause the computing device to present a message associated with a multimedia message, the multimedia message being prepared by a sender using text and emoticons inserted in the multimedia message, and delivered audibly by an animated entity, the instructions using a plurality of stored characters from which to choose a message video to display, the instructions further causing the computing device to perform operations comprising:

performing an emoticon analysis of the emoticons by providing scores for the emoticons in the multimedia message and determining a value associated with all the emoticons in the multimedia message based on the scores;

generating a message video according to the emoticon analysis, the value and based on text-to-speech audio generated from the text inserted into the multimedia message, the generating further comprising synchronizing the text-to-speech audio with animation data from an animation server to yield the message video;

choosing an advertisement from a plurality of stored advertisements according to the emoticon analysis, wherein the advertisement is chosen is based on the value; and transmitting the advertisement and the message video for display on a user device.

3. A system for presenting a message associated with a multimedia message, the multimedia message being prepared by a sender using text and emoticons inserted in the multimedia message, and delivered audibly by an animated entity, and delivered audibly by an animated entity, the system using a plurality of stored characters from which to choose a message video to display, the system comprising:

a processor; and a computer readable storage device storing instructions which, when execute by the processor, cause the processor to perform operations comprising:

performing an emoticon analysis of the emoticons by providing scores for the emoticons in the multimedia message and determining a value associated with all the emoticons in the multimedia message based on the scores;

generating a message video according to the emoticon analysis, the value and based on text-to-speech audio generated from the text inserted into the multimedia message, the generating further comprising synchronizing the text-to-speech audio with animation data from an animation server to yield the message video;

choosing an advertisement from a plurality of stored advertisements according to the emoticon analysis, wherein the advertisement is chosen is based on the value; and transmitting the advertisement and the message video for display on a user device.

* * * * *